INVENTOR.
LEON O. PARKER
BY
ATTORNEYS

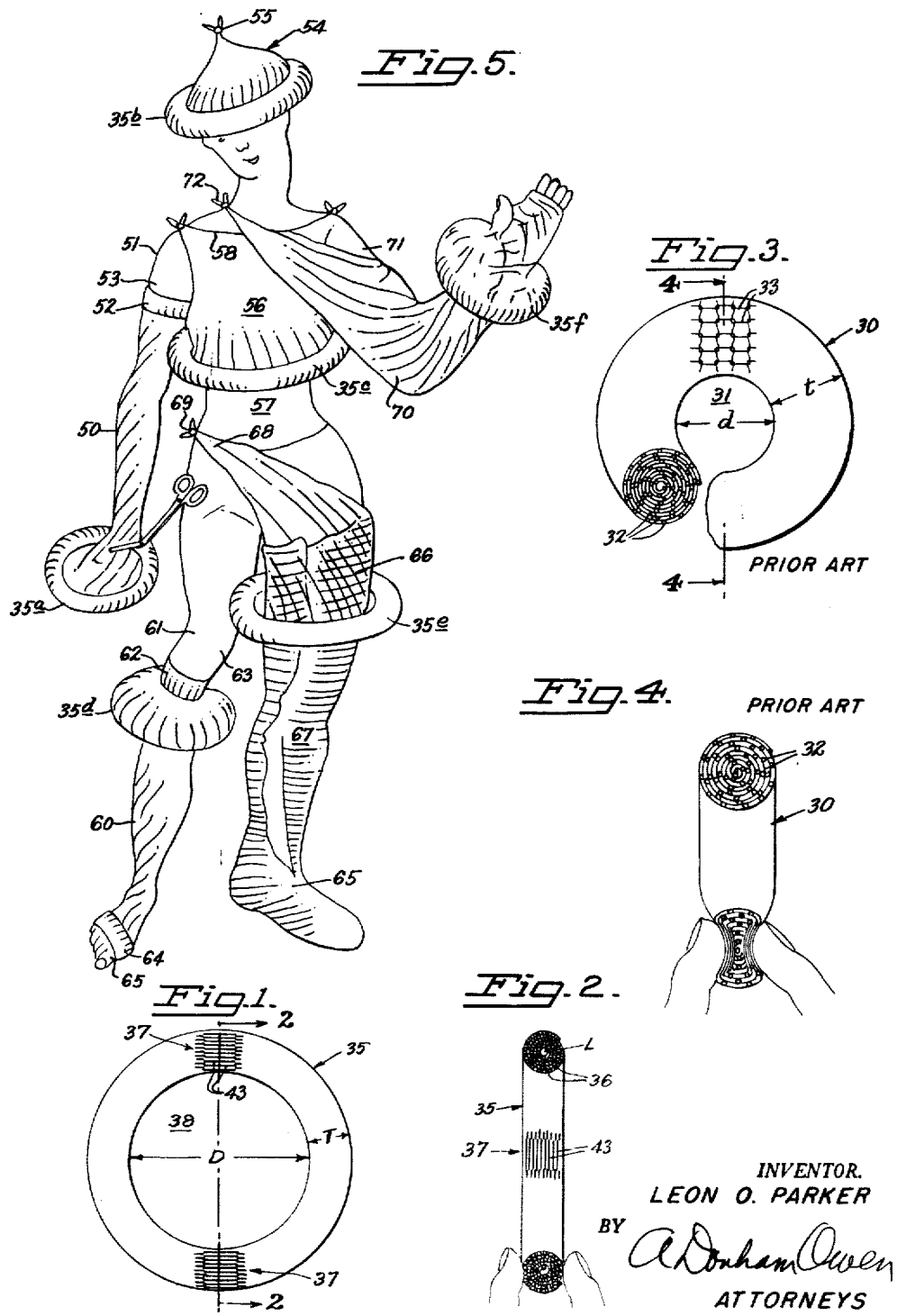

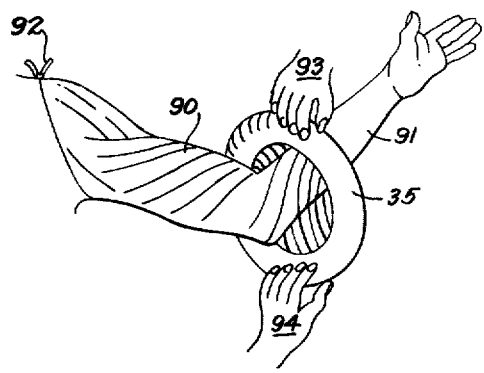
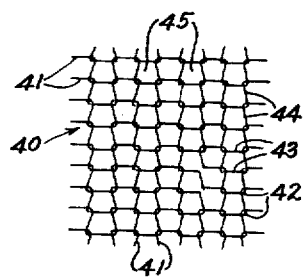
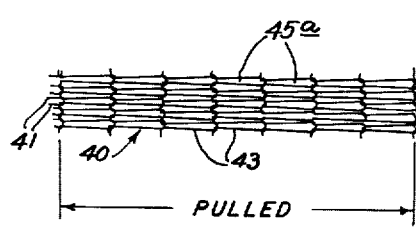
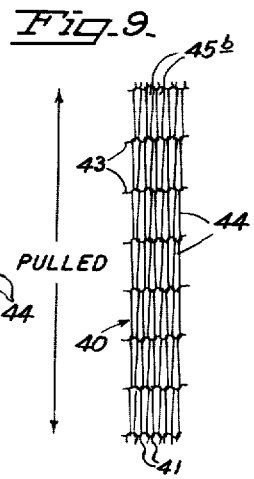

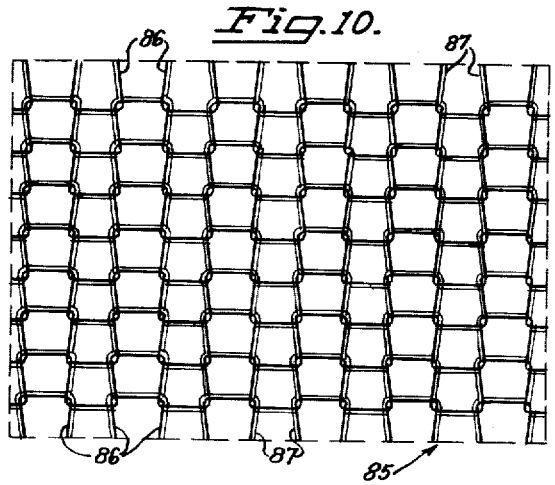
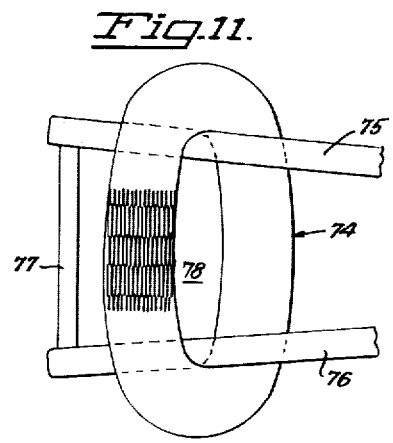
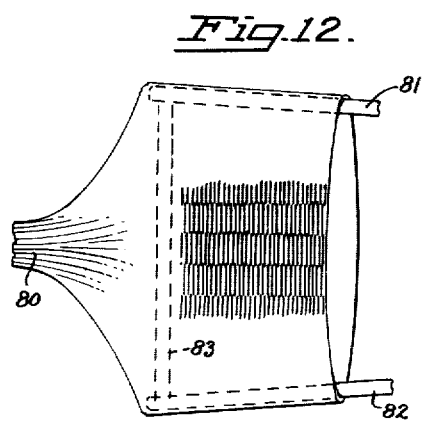
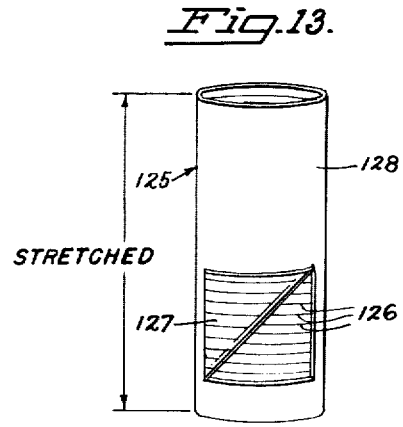
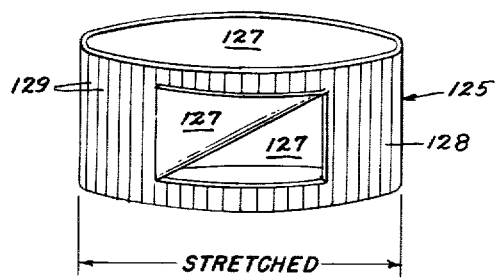
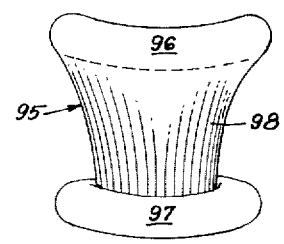
INVENTOR.
LEON O. PARKER
ATTORNEYS July 16, 1963 L. O. PARKER 3,097,644
TUBULAR SURGICAL BANDAGES, CASTS, AND MOLDS
Filed Aug. 24, 1961 7 Sheets-Sheet 4

July 16, 1963 L. O. PARKER 3,097,644
TUBULAR SURGICAL BANDAGES, CASTS, AND MOLDS
Filed Aug. 24, 1961 7 Sheets-Sheet 5

INVENTOR.
LEON O. PARKER
BY
A. Dunham Owen
ATTORNEYS

July 16, 1963

L. O. PARKER 3,097,644

TUBULAR SURGICAL BANDAGES, CASTS, AND MOLDS

Filed Aug. 24, 1961

INVENTOR.
LEON O. PARKER
BY
*A. Dunham Owen*
ATTORNEYS

July 16, 1963 L. O. PARKER 3,097,644
TUBULAR SURGICAL BANDAGES, CASTS, AND MOLDS
Filed Aug. 24, 1961 7 Sheets-Sheet 7
*Fig. 30.*
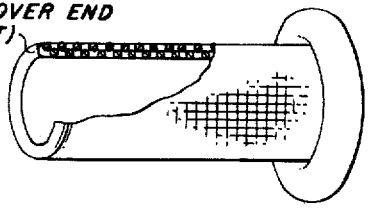
FOLDED OVER END (NOT CUT)
*Fig. 31.*
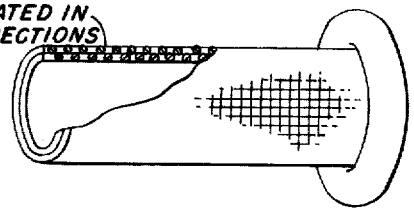
KNIT TUBES, AXIALLY ROTATED IN OPPOSITE DIRECTIONS
*Fig. 32.*
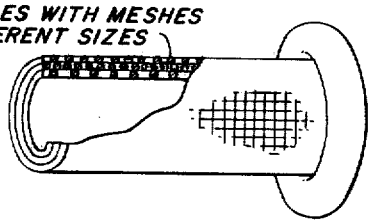
KNIT TUBES WITH MESHES OF DIFFERENT SIZES
*Fig. 33.*
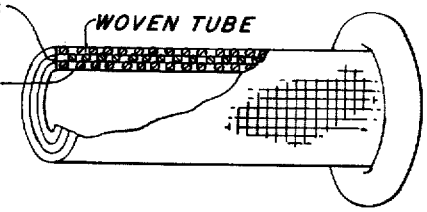
KNIT TUBE
WOVEN TUBE
NET TUBE
*Fig. 34.*
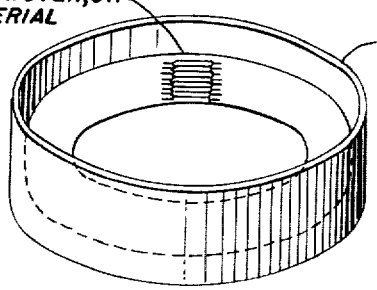
DOUGHNUT ROLL OF KNITTED, WOVEN, OR NET MATERIAL
CONTAINER OF METAL, PLASTIC, OR GLASS
INVENTOR.
LEON O. PARKER
BY 
ATTORNEYS

United States Patent Office 3,097,644
Patented July 16, 1963

3,097,644
TUBULAR SURGICAL BANDAGES, CASTS, AND MOLDS

Leon O. Parker, San Francisco, Calif., assignor to San Francisco Research Corporation, San Francisco, Calif., a corporation of California
Filed Aug. 24, 1961, Ser. No. 133,677
84 Claims. (Cl. 128—157)

This invention relates to improved surgical dressings, bandages, casts, and the like. More particularly, this invention employs a cloth tube rolled onto itself and treated in a novel way so as to form a firm, rigid, toroidal roll, from which it can readily be applied to an object, such as a body part, quickly, evenly, and smoothly.

Many problems associated with the construction, application, and performance of surgical dressings, bandages, and surgical casts are solved by this invention. Woven cloth strips, long the accepted material for building up such dressings, bandages, and casts, have many disadvantages. One is that considerable time is required to build up a bandage or cast from such strips, especially where large areas of the body must be covered. Time spent in bandaging increases the total surgical time, often including time under anesthesia, and therefore increases surgical danger. Where battle casualties are involved, the wounds must be treated quickly to minimize the effects. Using the special toroidal roll of this invention, a finished dressing covering an entire arm, leg, or other body part can be completed in a matter of seconds.

Another problem with dressings made from cloth strips is that their edges establish rough surfaces next to the skin of the patient. Often the skin is sensitive, or is broken as by a wound, and these rough edges irritate the skin and delay healing. The skin-contacting surfaces of bandages made from the toroidal roll of this invention are smooth and without edges, which means that skin irritation is reduced and healing accelerated.

The strips from which conventional bandages and surgical dressings are made are very prone to slip on one another, and holding such a bandage in place is difficult. Strip bandages also tend to "give" or stretch out of shape, especially when subjected to movement of the body part which they cover. This invention provides a bandage which flexes with the body part without shifting or slipping out of proper position.

Application of conventional woven or elastic strip bandages results in the formation of constricting bands in some areas with loose pockets between the bands. Any swelling, from whatever cause is constricted by these bands, thus obstructing the flow of tissue fluids, causing pain, and preventing proper healing. When a bandage is applied in accordance with my invention, no constricting bands or loose pockets are formed. Consequently, no restriction of tissue fluid flow occurs, so that there is no pain or prevention of the healing processes.

Unlike ordinary cloth bandages, which are unwieldy and are difficult and time-consuming to apply over a body part, the novel article of this invention is easy to handle and quick to install over any part of the body. Furthermore, this invention enables even unskilled operators to form a snug, smooth covering which compresses or grips the body part uniformly throughout, a condition substantially impossible to achieve with other types of bandage material.

Surgical casts applied with the bandage material of this invention are far superior to those made with other materials, such as strip bandage and stockinette. These prior art materials are difficult to apply over a broken body member without causing pain and do not provide a good foundation for the plaster of Paris or other hardening agent to grip. My novel production can be put on over a sensitive body part without causing as much pain, and it acts as an excellent base for all cast-hardening agents.

Broadly considered, my invention comprises a comparatively stiff, rigid, and radially stretched toroidal or "doughnut-shaped" roll of tubular cloth with a greatly enlarged "hole" or central opening. This "doughnut" roll preferably is formed from loosely knitted cloth tubing, but substantially any fabric, such as woven cloth or fish-net cut on the bias and then made into a tube, can be used. In order to facilitate the pulling or stretching procedure, the cloth is pretreated to temporarily facilitate the ability of the yarn or thread to slide on itself, as at the loops of knitted material. The "hole" in the roll is large enough to accommodate large objects, such as a human foot, yet the cloth tube can be quickly and uniformly "shrunk" to a much smaller diameter, such as that of the ankle, all without any aggravation of the injury.

Since knitted cloth tubing is preferred, it will be used in conjunction with the description of the invention. However, woven cloth and fish-net material which have been cut on the bias and then two of its opposing edges joined to form a tube, are also satisfactory. When woven cloth is used, two of the opposing edges can be joined by sewing to form the tube. In order to facilitate axial stretch of the tube, sewing should be done either with elastic thread or with non-elastic thread in a zig-zag pattern. When fish-net is used, two opposing edges are also joined to form a tube, but here joining can be accomplished merely by tying together the ends of the cord or fiber of the net.

Other features and advantages of the invention will be described in detail with reference to the accompanying drawings in accordance with 35 U.S.C. 112. However, it is to be understood that the details are not intended to limit the invention, the scope of which is defined in the appended claims.

In the drawings:

FIG. 1 is a plan view of a stretched toroidal roll of knitted cloth embodying the principles of the invention, showing its large "hole" or central opening;

FIG. 2 is a view in section taken along the line 2—2 of FIG. 1, showing the tight structure of the roll of the invention.

FIG. 3 is a plan view of a non-stretched roll prepared from the same size of unstretched knitted cloth tube as in FIGS. 1 and 2, showing its relatively small central opening;

FIG. 4 is a view in section taken along the line 4—4 of FIG. 3, showing the loose flimsy roll of FIG. 3 being squeezed by hand, and showing its lack of the rigidity possessed by the roll of FIGS. 1 and 2;

FIG. 5 is a view in perspective of a person with various body parts covered by dressings of knitted tubular cloth applied from the stretched toroidal roll of FIGS. 1 and 2;

FIG. 6 is a diagrammatic view in perspective of an arm being covered by a tubular bandage from the stretched roll of FIGS. 1 and 2, showing how uniform axial stretching and radial rotation of the roll while applying the knitted tube will conform the tube to every contour of the arm;

FIG. 7 is a plan view of a portion of single-strand, loosely knitted cloth;

FIG. 8 is a plan view of the cloth portion of FIG. 7, stretched somewhat widthwise, showing that as it extends widthwise it simultaneously contracts in length;

FIG. 9 is a plan view of the cloth portion of FIG. 7, stretched lengthwise, showing how it then contracts in width;

FIG. 10 is a fragmentary plan view on an enlarged scale, of a cloth loosely knitted from two parallel but different strands;

FIG. 11 is a view in perspective showing one method of stretching a doughnut roll in practicing the invention;

FIG. 12 is a view in perspective showing a method of stretching a knitted cloth tube in practicing the invention;

FIG. 13 is a view in perspective of an axially stretched knitted tube with one section cut and laid open to show how the inside has ridges and the outside is smooth;

FIG. 14 is a view in perspective of the same knitted tube of FIG. 13 but stretched radially and with one section cut and laid open, showing how the outside has ridges and the inside is smooth;

FIG. 15 is a view in side elevation showing a knitted cloth tube rolled from both ends, one roll on the inside of the tube and the other roll on the outside;

FIG. 30 is a view similar to FIG. 29 of multi-layered tube made from a single folded tube, partially rolled into a doughnut roll.

FIG. 31 is a similar view of a multi-layered tube comprising two knit tubes axially rotated in opposite directions, partially rolled into a doughnut roll.

FIG. 32 is a similar view of a multi-layered tube comprising three knit tubes with meshes of different sizes, partially rolled into a doughnut roll.

FIG. 33 is a similar view of a multi-layered tube comprising one knit layer, one net layer, and one woven layer, partially rolled into a doughnut roll.

FIG. 34 is a view in perspective of a doughnut roll of the invention inserted into a container.

*General Consideration of the Invention*

Figure 17:
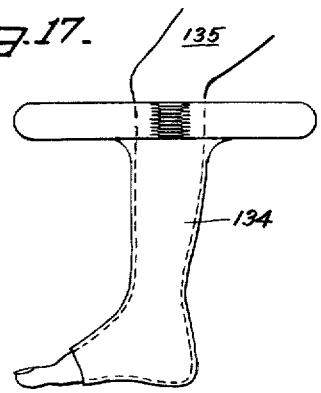
FIG. 17 is a view in side elevation of a cast formed from a knitted cloth tube according to the invention, the tube being applied to a leg from a stretched doughnut roll and stretched axialy to reduce the diameter of the tube and conform it to the leg.

A toroidal, or doughnut, roll 30 of knitted cloth, as shown for example in FIGS. 3 and 4, can be made by rolling up a length of loosely knitted tubular cloth upon itself much as one would roll up a stocking before putting it on. However, such a roll 30 leaves only a very small hole or opening 31, and the roll 30 lacks rigidity and solidity, both because the successive layers 32 are not snugly against each other and because the circumferential running strand "lines" 33 are spaced apart from each other. Even if the cloth tube is stretched radially to its purported maximum, and then tightly rolled into a doughnut roll, this roll will not be rigid and will have a hole substantially less in diameter than possible with my invention. Therefore, this partially stretched roll, as well as roll 30, does not embody my invention and does not possess the many advantages of my invention that are discussed below.

In order to arrive at a roll 35 of my invention, as illustrated in FIGS. 1 and 2, with its characteristic of solidity and self-supporting rigidity, its snugly adjacent layers 36, its special arrangement of threads 37, and its greatly enlarged hole 38, the combination of which enables application of the cloth tube to a wide variety of sizes of objects and its conformation to them, special treatment is required. Following this special treatment, the roll 35 or the tube from which it is made can be "stretched" or pulled radially for substantially the full amount of its nonelastic enlarging ability; without this treatment, maximum enlargement cannot be obtained.

As illustrated in FIG. 7, typical unstretched loosely knitted cloth 40 is made by interlacing a single yarn or thread 41 in a series of connected loops 42, at which the yarn turns a right angle. As a result, the cloth presents the aspect of two systems of lines 43 and 44, the lines 43 of one system running in one direction and those 44 of the other in a transverse direction. The lines 43 are parallel to each other and are intersected at uniform intervals by the lines 44 which are also generally parallel to each other. Depending on the closeness or tightness of the knit, the interstices 45 between the lines will be small to large. Before the cloth 40 is pulled, the interstices 45 may be substantially square.

When the knitted cloth 40 is pulled in the direction of one line system (FIG. 8), the lines 43 running in this direction elongate and move towards each other, making the interstices 45a somewhat rectangular, and at the time of maximum non-elastic elongation the lines 43 come to rest abutting each other. At the same time, the transversely running lines 44 shorten and move further apart, with the result that the cloth 40 gains dimension in one direction at the expense of its dimension in the other direction. Conversely, when the cloth 40 is pulled in the transverse direction (FIG. 9), the lines 44 running in the direction of the stretch will elongate and move toward each other and the lines 43 will shorten and move apart, and the interstices 45b are elongated in the transverse direction.

This movement of the lines 43 and 44 with respect to each other is what constitutes the "stretching" or elongation of the cloth, in distinction to the actual elongation or stretching of the thread 41 itself. Except in tubes made with elastic thread, the thread or strand 41 itself is relatively non-stretchable and non-elastic, so that the maximum elongation of the cloth 40 in either direction is directly proportional to the actual length of the strands themselves. Cloth that has been pulled in one direction can be restored to its original dimension or pulled out to the maximum elongation in the transverse direction by pulling it in this transverse direction. There is little, if any, tendency for the cloth 40, when made of non-elastic material, to restore itself to its original pre-stretched condition. By alternately stretching and contracting the cloth 40 in these two directions, accurate conformation to objects of substantially different sizes or shapes can be achieved.

It should be understood that the stretch referred to above is not mere extension, for there is the corresponding contraction in the transverse direction, i.e., the direction perpendicular to the direction of pull. Material that gets soggy or mushy when wet and that tends to act in such a way that once stretched, its former dimensions cannot be regained, is not suitable for use in this invention. As examples, felt and batting tend to pull apart and to remain so; they do not respond sufficiently to crosswise pull and they cannot be returned to their original shape. Therefore, they are unsatisfactory. The additional fact that they do not expand sufficiently when stretched is bad enough, but their inability to contract by a transverse stretch is their more important failure.

It is true that any material may be stretched somewhat, but in order to practice the present invention, a really substantial change in dimensions is required—a marked ability to expand and contract under pull. This is necessary, particularly when the stretched roll of cloth tubing must be of sufficient size to go over a large object, such as a foot, and then the cloth tube coming from this roll must be contractible enough to fit a relatively small object, such as the small segment of the leg. Loosely knit cloth possesses the greatest facility for such stretching and contraction, and is preferred for most purposes. However, any fabric, such as woven cloth or fish-net, will stretch on the bias to some extent, so that this invention, although disclosed primarily with knitted cloth, is not limited to such knitted material, but includes any cloth which is extendible and contractible, on the bias or otherwise.

Figure 21:
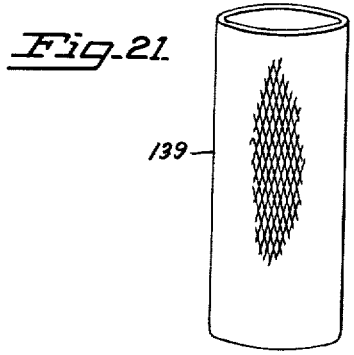
FIG. 21 is a view in perspective of an axially stretched woven cloth tube.
Figure 24:
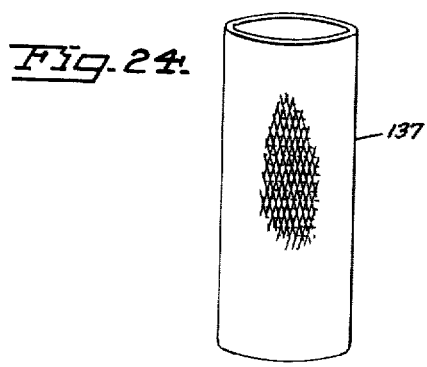
FIG. 24 is a view in perspective of an axially stretched tube of fish-net.
Figure 22:
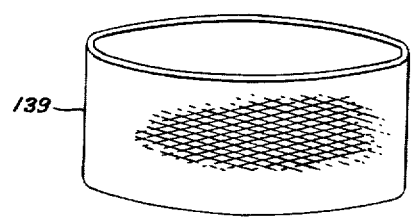
FIG. 22 is a view in perspective of the same tube of FIG. 21, but stretched radially instead of axially.
Figure 25:
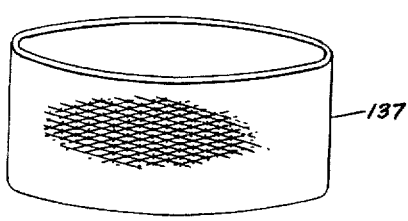
FIG. 25 is a view in perspective of the same tube of FIG. 24, but stretched radially instead of axially.
Figure 23:
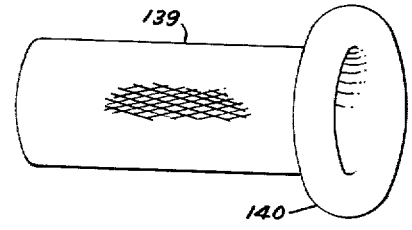
FIG. 23 is a view in perspective of a woven cloth tube partially rolled into a stretched doughnut roll.
Figure 26:
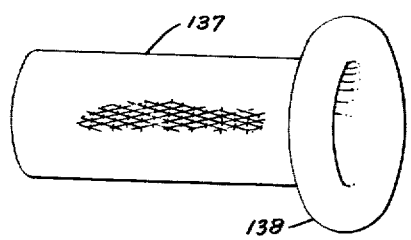
FIG. 26 is a view in perspective of a tube of fish-net partially rolled into a stretched doughnut roll.

For example, a strip of fish-net can be cut on the bias and the ends of the fish-net cord on one cut edge tied to the corresponding ends on the opposite cut edge to form a tube 137 (FIGS. 24, 25 and 26), which is stretchable and contractible both axially (FIG. 24) as well as radially (FIG. 25). In a similar manner, a strip of woven cloth can be cut on the bias and the two opposite cut edges joined, as by sewing with an elastic thread or with regular thread in an exaggerated zig-zag stitch, to form a tube 139 (FIGS. 21, 22 and 23). This tube too can be stretched and contracted both axially (FIG. 21) as well as radially (FIG. 22). Both tubes 137 and 139 can be rolled into expanded doughnut rolls 138 and 140, respectively, the same as knitted material. There are also various forms of knit which are useful in this invention, including warp knit which looks like bulky knit sweater material, and loose knit which is used herein to illustrate the invention.

To facilitate maximum "stretching" or enlargement of the hole in the doughnut roll, before the roll is stretched it is pretreated by subjecting it to heat and/or moisture under conditions of time, temperature and pressure which will temporarily increase the smoothness and pliability of the threads 41 of the cloth 40 and decrease their resistance to sliding or gliding and bending movement at the loops 42. The roll is then stretched radially and held in this stretched position until the pretreatment effects have expired. The stretch can be maximum, i.e., until the circumferentially-running strand-lines 43 are abutting each other and the axially extending strand lines 44 are substantially the maximum attainable distance apart, or it may be less than maximum depending on circumstances. Since the pretreatment only temporarily increases the slidability of the strands, in time the thread 41 reverts to its original condition with regard to its resistance to such sliding movement.

This process of pretreating the roll to reach maximum enlargement is used on rolls which have been partially stretched as well as on rolls which have not been stretched at all. For instance, untreated rolls can be "pre-stretched" as much as possible without treatment, then pretreated according to this invention, and then stretched further to their true maximum. Furthermore, unrolled tubular cloth can be pretreated and stretched, or "pre-stretched," then pretreated, then streched, in the same way.

The resultant difference in size between the doughnut roll 35 made according to my invention, and the roll 30 made from the same length of the same cloth tube but without the pretreatment of my invention, is strikingly illustrated in FIGS. 1–4. The radially stretched doughnut roll 35 of FIGS. 1 and 2 has a hole 38 with a diameter D. This roll 35 has been radially stretched to its maximum so that the cloth strand lines 43, running circumferentially, are substantially in abutting relationship. In the roll 35, the diameter D is approximately four times the thickness T of the roll, and the layers 36 are so tightly compacted that the roll is rigid enough to maintain its round configuration when stood on its side. Even when this roll 35 is squeezed between the fingers, as illustrated in FIG. 2, it compresses very little. Where the roll is made from a tube of shorter length, or of thinner material, the diameter D will be even greater than four times the thickness T of the roll.

The unstretched roll 30 in FIGS. 3 and 4 has a hole 31 with a diameter d, and its circumferential strand lines 33 are relatively distant from each other. The diameter d is only about the same as the thickness t of the roll 30 and the layers 32 are associated quite loosely. This roll 30 is so soft and flimsy that it will not support itself on edge and, as illustrated in FIG. 4, it can be compressed considerably by the fingertips. Whereas the roll 30 cannot be placed over an object larger than the diameter d without stretching, tugging, and other procedures painful to the patient, the stretched roll 35 of my invention will go over a much larger object without these aggravating manipulations. Then, when the cloth tube is unrolled on the object, which can be accomplished much more quickly, smoothly, and easily from the stretched roll 35, it can be contracted or "shrunk" down to the object simply by pulling it axially.

*Application of the Doughnut Roll*

The doughnut roll 35 of this invention makes it possible to uniformly cover substantially any part of the body, quickly and without discomfort to the patient, with a smooth, non-irritating dressing of tubular cloth under whatever tension or closeness of conformation is desired.

As shown in FIG. 5, the doughnut or toroidal roll 35 may be used in a variety of ways. Here, one such roll 35a is shown applied rapidly as a single-ply dressing 50 with smooth and close conformation around one arm 51 of a patient. The free end 52 of the tube 50 is shown anchored around the patient's upper arm 53. The roll 35b, which may be identical to the roll 35a, is being used to make a closely conforming head bandage 54, free end 55 being knotted or tied into a closed end. A third roll 35c, somwhat larger, is shown in the course of application as a dressing 56 covering and conforming to the upper torso 57, its free end 58 being anchored at the neckline and shoulders. A fourth roll 35d is shown after two plies of a bandage 60 have been put on a lower leg 61. The uncut upper end 62 of the bandage is anchored just below the knee 63 and the free end 64 is anchored near the end of the foot 65 where the bandage is reversed on itself. A dressing may be snugly retained and compressed under this bandage 60. A fifth roll 35e is shown as a covering 66 over a leg dressing 67, its free end 68 being anchored by a knot or tie 69 at the patient's waist. This bandage also can be used to snugly compress and fit a cast or splint of moldable material. Still another roll 35f is shown being applied as a bandage 70 on an arm 71, with an end 72 anchored around the neck.

In each situation, after the tube is unrolled from my stretched doughnut roll 35, it can be snugly fitted around the enclosed body part by stretching it axially, and varying degrees of compression of the body part can be obtained by a combination of axial stretching and circumferential rotation of the roll 35 as the tube is being unrolled. All this is explained below in more detail.

*Examples of Suitable Tubular Knit Cloths*

One suitable type of knitted tubular cloth for making a stretched roll according to this invention contains approximately 12 strands to the inch when in its normal non-stretched condition, and the interstices between the strands are almost square. When a 12 inch length of this knitted tube is stretched axially to its maximum length, it will be approximately 36 inches long and 4½ inches in circumference. When stretched radially to its maximum diameter, it will measure about 10 inches in length and about 20 inches in circumference.

Another suitable cloth is stockinette, a knitted tubular fabric with 10 threads to the inch in each direction. When stretched out lengthwise it has 7 threads to the inch along its length and 34 threads to the inch along its width. The circumference of the tube varies from 12 inches to 58 inches.

Yet another tubular knit cloth, tested and used satisfactorily, has a natural diameter of 14 inches, and weighs about 26 grams per square yard. A 12 inch length of this tube can be stretched to about 40 inches, and its diameter can be increased to about 17 inches.

Pretreating the Cloth

In order to prepare a stretched doughnut roll 35 according to this invention, it is necessary to pretreat the strands of the tubular cloth, either before or after it is rolled, so that they will glide or move easily past each other, as at the loops in knitted material. This pretreatment can take any one of several forms, depending on the type of material from which the cloth is made.

For instance, if the cloth is knitted from pure cotton, the pretreatment process may comprise moistening and heating the cloth; the strands will then slip past each other and bend sharply at their intersections. A washday detergent or soap may be added to the moistening liquid, or applied to the cloth in some other manner, to reduce the friction between strands so that they slide easier. Water, at about 150° F. to 212° F., is a suitable pretreatment medium for cotton cloth, and twenty minutes soaking will sufficiently pretreat the strands so that maximum stretch can be easily achieved.

Where the cloth is knitted from synthetic fibers, often heat alone is sufficient as the pretreatment. Nylon and Dacron knits can be suitably pretreated by subjecting them to boiling water. If the temperature is elevated to between about 230° F. to 240° F., the loops tend to set upon cooling. Orlon, which has been contracted by heat treatment, also can be pretreated by boiling water. However, Orlon that has not been so contracted can be handled by rolling it into a conventional loose, flimsy roll, the roll placed around a semi-rigid core of desired size, and the roll and core heated to between about 225° F. to 300° F. for 30 minutes. The Orlon contracts, tightening the cloth into a firm roll.

In addition to pretreating with heat and/or water, certain fibers can be pretreated by the application of other liquids, including various oils, glycerine, and others which also cause the strands to soften or which increase their slipperiness. Some of these conditioning materials can be left in the cloth, or they can be removed. For instance, warm petrolatum can be used as a pretreating material, and melted paraffin is suitable as a conditioner for cotton, and both can be left in the cloth if desired.

Stretching the Cloth

Where the knitted cloth tube has first been rolled into a doughnut roll and the roll then pretreated, the roll can be stretched either by hand or, as illustrated in FIG. 11, by placing the roll 74 over two rods 75, 76 that are held apart at one end by a rigid spacer 77, and then forcing apart the other end of the rods 75, 76 apart, thereby enlarging the diameter of the hole 78 in the roll 74. The roll 74 is held in this stretched condition until the strands have lost their increased slidability, so that the roll 74 has no tendency to revert to its original smaller diameter when the stretching force is removed. This method results in a somewhat elliptical roll. Where a round roll is desired, the stretched roll is placed over a round form, such as a cylinder, with a diameter substantially the same size as the diameter of the hole in the stretched roll, and left there until the pretreatment effects have passed.

Rolls with other shapes can also be made in the same manner.

Two factors are involved with determining how much force is required for the stretching procedure, namely (1) the size of the diameter of the tubing, and (2) the length of the section used. For instance, a doughnut roll made from a 30 foot long section of loosely knit tube, approximately 16 inches in circumference, will require a force of about 24 to 50 pounds to properly stretch it. A 30 foot section of tube with a circumference of about 30 inches, knitted from the same material, will require a stretching force of about 100 to 175 pounds. It has been found that a stretching force of about 100 pounds must be maintained from 2 to 3 minutes to do a satisfactory job. If 175 pounds of force is used, one or two short applications usually stretches the roll to its maximum diameter. This stretching force can also be applied by hanging the roll on a firmly mounted object, placing a round ring or similar object through the "hole,' and applying force to this ring with a weight or hand lever.

If the roll is still wet from the pretreatment step, when it is stretched, most of the liquid is squeezed out. After the roll is stretched, it must be dried, such as by heat or air. Where the tubular cloth is knitted from plastic strands and these strands have been pretreated by heat alone, they must be kept stretched while they are cooling. One way of maintaining the doughnut roll in its stretched condition during the drying or cooling process is by placing it over a suitably shaped firm, rigid core, such as hard rubber, plastic or the like, which has a diameter equal to that of the hole in the stretched doughnut roll.

Drying and cooling the pretreated and stretched cloth in the stretched condition somewhat "fixes" the loops of the knitted strands in this stretched state. However, stretched cotton cloth has a tendency to revert to its original unstretched condition. This can be prevented to some extent by storing the roll out of contact with atmospheric conditions.

If desired, the cloth tube can be pretreated, stretched, and then cooled or dried without rolling to provide a much firmer product than an untreated tube. Additionally, the tube can be pretreated first, then stretched, and then rolled into an expanded doughnut roll. For instance, a nice, stretched doughnut roll can be made from a knitted cotton tube by soaking the tube in hot water, cooling the tube to about 110° F., then stretching it, then rolling it while wet, and maintaining it in this stretched condition until it dries. The stretching can be done by hand (see FIG. 12) by placing the tube 80 over two rods 81, 82 held apart at one end by a rigid spacer 83, and then forcing apart the free ends of the rods 81 and 82.

Tube Knitted From Dissimilar Strands

By using cloth tubing knitted from two different fibers, some special advantages can be gained. As illustrated in FIG. 10, such cloth 85 can be knitted in tubular form from a strand 86 of one fiber, such as cotton, and a coextensive strand 87 of another fiber, such as nylon. The tube is then rolled up into a doughnut roll, and the roll pretreated by soaking it in boiling water for 30 minutes, and then stretched radially. While held in this stretched condition, the roll is subjected to pressurized steam at about 200° F. for 30 minutes. This pretreatment fixes both the cotton and the nylon strands. In the stretched condition, the loops of both strands are very acute, and as the cloth is unwound the loops of both strands exhibit substantially identical configurations.

The fixation of the nylon strands resulting from the foregoing pretreatment is not adversely affected by moisture. However, the fixation of the cotton strands is reduced somewhat when moisture comes in contact with them. Thus it is advisable to enclose these and other stretched rolls and tubes in an air-tight, moisture-impermeable container to retain their tightness and rigidity.

In some situations, a knitted cloth tube with the fibers of one material set while under pull in one direction, and the fibers of the other material set while under pull in the other direction, is desirable. For example, if a length of cloth tube made from the material illustrated in FIG. 10 is stretched to its maximum length, wound axially around a hollow, ventilated core, and heated to 300° F. by steam under pressure for 20 minutes, the nylon strands contact and set in an "axially" stretched position. The tube is then cooled, removed from the core, and rolled into a doughnut roll. The doughnut roll is soaked in water at about 110° F. for one hour, stretched, and then dried in the stretched position at room temperature to set the cotton strands in a "radially" stretched position. The result is that the nylon strands have a tendency to axially elongate the knitted tube, and the cotton strands have a tendency to enlarge the tube in the transverse or radial direction.

This invention also makes it possible to prepare a knitted cloth tube from two coextensive strands, one of which is stretched and the other relaxed. As an example, a tube knitted from coextensive strands of cotton and orlon is rolled into a doughnut roll. The roll is superheated to about 275° F. to 350° F., and then stretched radially. While held in this stretched condition, the roll is again heated by pressurized steam at 300° F., for 30 minutes, causing the orlon strand to contract, but not affecting the cotton strand. The result is a tube with a tendency to contract both radially and axially.

Applying the Treated Cloth Tube from the Roll

Using a doughnut roll 35 stretched according to my invention, a knitted cloth tube 90 (FIG. 6) can be applied over an object such as an arm 91 in less time and with greater uniformity in tension and compression than by any other known method. The general procedure is as follows: (1) place the roll 35 over the object 91 such that the object extends through the "hole" in the center of the roll 35; (2) attach the exposed end 92 of the cloth tube 90 securely to the object 91; (3) grasp the side of the roll 35 nearest the beginning 92 with the fingertips of both hands 93 and 94, such that the hands are on diametrically opposite sides of the roll; and (4) unroll the roll while tensioning the resulting tube 90 axially in the direction of unrolling and while also rotating the roll around its axis. By adjusting the degree of axial rotation of the roll 35, and the amount of tension applied to stretch the tube 90, substantially any irregular configuration can be covered smoothly and with even pressure. Care should be taken that the roll 35 is held so that the fingertips do not touch or catch in the unrolling tube 90, for if they do, uneven tensioning on the tube and an uneven dressing will result. Also, if the roll 35 is merely unrolled, and not rotated around its axis, the tube 90 is not compressed as much to the configuration of the object.

The end 92 of the tube 90 can be secured to the object 91 by various adhesives, by tying, or by other suitable means. For instance, adhesive tape or any of the numerous liquid adhesives, including benzoin, can be used. In addition, the tube 90 can be secured to the object 91 at any place along its length by rotating the roll 35 around its axis while unrolling it without applying axial tension, thus laying down the tube 90 in one spot as a snug cuff (see such a cuff 62 in FIG. 5). This procedure is also a neat method of preparing the end of the tube for easy attachment to the patient or object.

A multiple-layer bandage or dressing like the bandage 60 (FIG. 5) can be made from one roll 35 simply by unrolling the cloth tube back and forth over the previous layer or layers. By this procedure, a covering of substantially any thickness and density can be constructed. This feature is of special importance where the tube is to be used in making a surgical cast or the like, to be discussed later.

Figure 16:
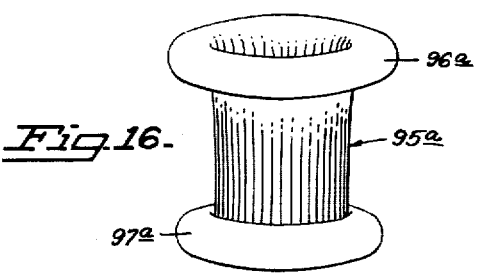
FIG. 16 is a view in side elevation showing a knitted cloth tube rolled from both ends with both rolls on the outside of the tube.

Another way of laying down a two (or more) ply dressing is from a single length of tube rolled from both ends into a so-called "double roll," as illustrated in FIGS. 15 and 16. One way (FIG. 15) of making this double-roll is by rolling up part of the tube 95 into a first doughnut roll 96, in the conventional manner of this invention. The remainder of the tube then can be turned inside out by passing it backwards through the "hole" in the first doughnut roll 96, and then rolling it up into a second roll 97. Alternatively (FIG. 16), the remainder of the tube 95a can be rolled up into a second doughnut roll 97a without first passing it through the hole in the first doughnut roll 96a. If desired, both rolls 96 and 97, and correspondingly 96a and 97a, can be pretreated and stretched at the same time.

When both rolls 96 and 97 are unrolled in the same direction, the beginning "end" of the bandage will be formed by the middle portion 98 of the tube 95, instead of by one end, and also will be two layered. This beginning "end" is a folded-over cuff, in distinction to a cut end of a tube. In the alternative, the rolls 96 and 97 can be unrolled in opposite direcitons (i.e., away from each other) to make a single layer bandage, or back and forth to build up a multiplayer bandage. One advantage of this double-roll device is that, in fracture cases, if both rolls are unrolled from the top it prevents overriding of the fracture.

Figure 27:
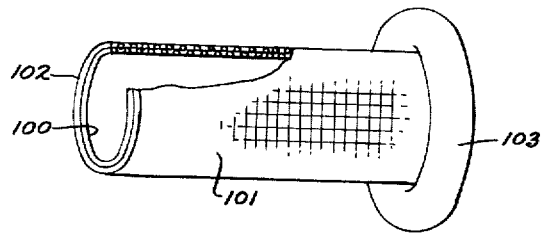
FIG. 27 is a view in perspective of a two-layered knitted tube partially rolled into a doughnut roll.

A two-layer bandage (FIG. 27) can also be made by pulling one end 100 of a knit tube 101 through its bore to meet the other end 102, and then rolling the two-layer tube up into a doughnut roll 103. If the roll is started with the cut ends 100, 102, applying the bandage from the roll will result in a folded-over edge at the bandage's beginning end. Conversely, if the folded-over edge (FIG. 30) is used as the starting end of the roll, the cut ends will form the beginning end of the tubular bandage.

Figure 28:
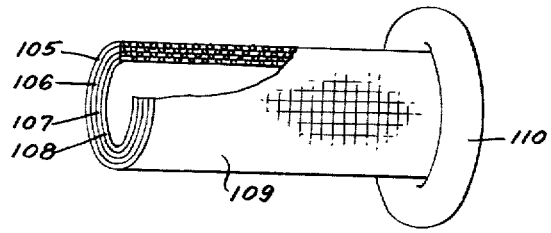
FIG. 28 is a view in perspective of a multi-layered tube partially rolled into a doughnut roll.
Figure 29:
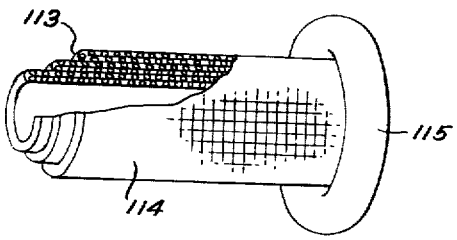
FIG. 29 is a view in perspective of another type of multi-layered tube partially rolled into a doughnut roll.

Multiple-layer bandages (FIG. 28) also can be formed by pulling a plurality of cloth tubes 105, 106, 107, 108 over each other to form one multi-layered tube 109, and then rolling the multi-layered tube into a doughnut roll 110. A similar multi-layered tube 112 (FIG. 29) can be made if one end 113 of a single-layer tube 114 is pulled back and forth over the tube 114 depositing one length of tube on each "pull." This multi-layered tube 112 then can be rolled into a stretched doughnut roll 115, starting at either end.

When a double-layered doughnut roll is constructed with one layer twisted or rotated in one direction around the axis of the tube, and the other layer likewise twisted but in the opposite direction (FIG. 31), the tube bandage laid down from this roll can be compressed or constricted by simple traction along its axis to a much greater degree than if the layers were not twisted. As this type of tube is unrolled, a twisted bandage is formed without twisting the roll.

If one layer of a double-tubed doughnut roll is made with a more coarse mesh than the other layer (FIG. 32), a different effect is obtained than where both layers are of the same degree of coarseness, i.e., the coarse mesh does not tend to constrict as much as fine mesh. In similar manner, the various layers of a multi-layered tube can be constructed from cloth of different meshes or types (FIG. 33) to give a wide range of products.

The simple procedure involved in applying the knitted tube from my stretched doughnut roll is a marked improvement over the laborious procedure required to apply knitted cloth tube from an unstretched roll. From an unstretched roll, the cloth tube must be stretched radially to pass over objects larger than the small "hole" of the roll, and where the body part is sensitive, such as where a broken arm or leg is involved, this causes pain and aggravates the wound. Also, the unstretched roll is very difficult to unwind, tending to do so unevenly, and is difficult to rotate uniformly, so that the cloth tube is not laid down evenly on the body part. All these disadvantages are eliminated by my invention.

Figure 19:
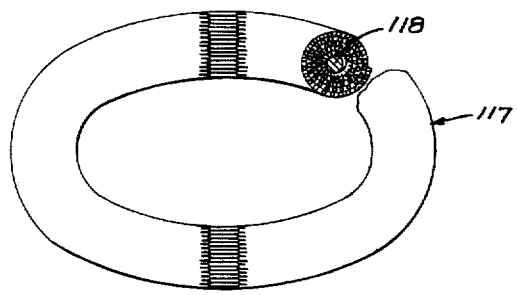
FIG. 19 is a view in perspective and partially in section, of a modified form of the invention embodying a stretched doughnut roll formed around an inner rigid ring.

The cloth tube can be applied evenly and smoothly with greater tension by using a doughnut roll 117 formed around a rigid core-like ring 118 (FIG. 19). This is easily done by placing one end of the tube around the ring 118 and rolling the tube up around it. Preferably, the ring 118 has a diameter almost as large as the maximum diameter to which the cloth tube can be stretched. Where relatively large diameter tubes are involved, this rolling-up process can be aided by placing the stretched tubing over a round form of inflated plastic or rubber (not shown), and then rolling the tube around the ring as it is pulled off the form.

Figure 18:
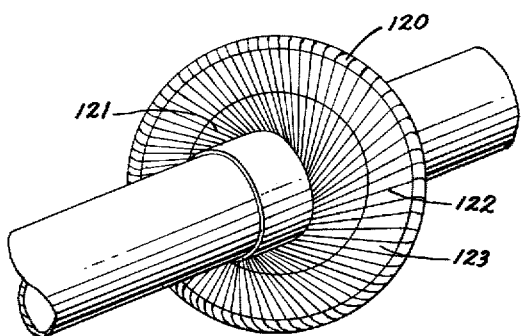
FIG. 18 is a view in perspective illustrating the application of a knitted tube over a cylindrical tube from a stretched doughnut roll, with the aid of an oversize rigid ring according to a modified form of the invention.

As illustrated in FIG. 18, application of the knitted tube from my stretched doughnut roll, with a greater degree of firmness and smoothness, can be achieved by placing a rigid ring 120 under the first (i.e., outer) layer 121 of the cloth tube 122 after it has been rolled into the stretched doughnut roll 123. The ring 120 should be slightly larger in diameter than the greatest diameter of the doughnut roll, so that it stretches the outer layer 121 of the knitted tube 122 away from the roll 123.

When a loosely knit cloth tube 125 (FIG. 13), as it comes off the knitting machine, is stretched axially, rough circumferentially-running ridges 126 are formed on the inside wall 127 of the tube 125. However, the outside wall 128 has no ridges, and in fact, is relatively smooth. Conversely, when the tube 125 is stretched radially (FIG. 14), rough axially-running ridges 129 are formed on the outside wall 128 while the inside wall 127 is smooth. Usually it is preferred to place as smooth a surface as possible against the skin, to cut down on irritation and abrasion. In situations where the cloth tube will be stretched more axially than radially when in its final position around a body part, the tube is applied to the body part "inside-out" relative to its condition as it comes off the knitting machine. This can be done by turning the tube inside out before it is rolled up, or by applying it "inside-out" from the doughnut roll. Where the cloth tube will be stretched radially in its final position, it is put on as it comes from the knitting machine, since the inside will be the smooth side.

It has been found that when a cloth tube has been rolled into a firm doughnut roll according to my invention, there may be a tendency for the roll to loose its firmness and become flabby if it is left exposed to the atmosphere. This is so no matter what procedure is followed in preparing the roll, and whether the roll is expanded or not. Cotton fabrics are particularly affected in this way. To prevent this, the roll should be enclosed in an air-tight, moisture-impermeable container, such as a plastic bag, glas jar, or metal can (FIG. 34), and sealed from the atmosphere.

Roll Sizings

The stretch doughnut rolls can be sized or impregnated with various materials to make them stiff. For instance, a combination of one part of a polyvinyl acetate emulsion, such as Polyco 529 (Borden Chemical Co.), and twenty parts of water makes a very satisfactory sizing composition. This can be applied to tubular cloth, the cloth dried, and then rolled in the usual manner. The hot water in the pretreating process will soften the sizing so that the roll can be stretched, after which it should be dried by elevated temperature. This doughnut roll is more stiff and rigid than an unsized roll, and is more suitable for some applications. The sizing does not prevent the strands from sliding past each other and therefore does not interfere with the stretching operation.

Figure 20:
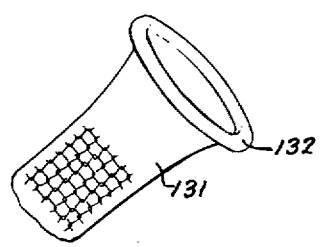
FIG. 20 is a view in perspective of a knitted tube with one end sized and rolled to form a stiffened inner core.

By adding large amounts of sizing to one end of a cloth tube, a stiffened inner core can be prepared from the tube itself. As an example, the first yard or so of the tube 131 (FIG. 20) is moistened with equal parts of Polyco 529 and water, this portion of the tube is then rolled up upon itself to form a core 132, the core 132 stretched to its maximum diameter, placed on a form to maintain this stretch, and dried. When this core is dry, the tube is pretreated by heat and/or moisture, and then rolled upon the core to complete the doughnut roll. The roll is stretched to its maximum diameter and dried in this stretched condition. An alternate method consists of sizing the first portion of the tube, drying it, then processing the roll with heat and moisture and rolling and expanding it when wet, and keeping it expanded during the drying process.

The resulting doughnut roll has a stiff inner core which gives it greater rigidity than a similar roll without this core, and the cloth tube can be applied from this roll in an extra firm condition. An even greater increase in stiffness can be obtained if a soft, pliable absorbent sheet, such as paper toweling, or any other suitable bulky material, such as paper pulp, is added to the sized end of the cloth tube.

Casts From the Treated Cloth Tube

Extendible and contractible tubular cloth treated according to my invention can be used in many ways and with many additives, including all those common to untreated tubular cloth. As illustrated in FIG. 17, one important use is as a matrix or carrier for plaster of Paris and other hardening agents in the formation of a surgical cast 134 on a broken part of the body such as a leg 135. These casts can be packaged and preserved complete, in either the dry or wet state, and applied with a minimum of fuss. Moistening a dry doughnut roll containing plaster of Paris, or some other similar moisture-sensitive hardening agent, makes the roll pliable, and the cloth tube then can be unrolled, stretched, and shaped to conform to the curvature of the body part. The dried cast is smooth without any rough or irritating surfaces next to the skin, and of uniform compression.

The stretched toroidal roll can be combined with other hardening agents, such as clay containing sufficient water to make it pliable, and then packaged in a sealed container, such as a metal can, and preserved in this moist condition. Alternatively, the clay-containing roll can be dried and kept dry until it is to be used, when it is moistened with water or other suitable liquid to restore it to its original workable pliable condition. The hardening agent also can be a thermoplastic composition such as paraffin, which may be used alone or in combination with various synthetic or natural resins. The hardening agent can be in emulsion form, so long as the agent will harden when the liquid has been removed by evaporation. Examples of this last type of hardening agent are an emulsion of polyvinyl acetate in water, and an emulsion of a synthetic latex in water.

The hardening agent also can be a monomeric resin which polymerizes upon the addition of a catalyst, such as Melamine Resin #405 (American Cyanamid Co.). A mixture of 1000 grams of Melamine Resin #405, 1000 grams plaster of Paris and 750 cc. anhydrous isopropyl alcohol is a very satisfactory hardening composition of this type. This mixture quickly dries in the absence of elevated temperatures or moisture. Tubular cloth treated with this composition is preferably packaged in an airtight container and stored in a cool atmosphere. To prepare it for use, the package is opened and the device soaked in warm water containing about 1.0% ammonium chloride and 0.1% hydrochloric acid. Fine sand or clay which has been moistened and rendered pliable with a colloidal solution of silicic acid makes a suitable hardening agent which sets up on the evaporation of the moisture. This composition can be fused by heat, and also be fired to make it extremely hard.

Plaster of Paris is probably the most widely used hardening agent in therapeutic casts. A method of producing a superior cast from a combination of plaster of Paris and a stretched knitted cloth tube rolled into an enlarged doughnut roll, according to my invention, is as follows. A section of knitted cloth tube 80 (FIG. 12) is cut, placed over two rods 81 and 82 and then expanded to its maximum diameter. While in this expanded condition, the cloth is sprayed with a gypsum-glue composition, such as a mixture of 100 pounds of finely ground gypsum, ½ pound of polyvinyl alcohol, ½ pound of methyl cellulose, and 4½ gallons of water. This composition is first thoroughly stirred, and applied to the cloth by a pneumatic spray, so that over half of the interstices of the cloth tube are completely filled, and the rest only partially filled. The impregnated tube is exposed to steam or air at about 275° F. for approximately 3 hours. This calcines the plaster and softens the glue so that the cloth is pliable, in comparison to its former rigid condition. The tube 80 is then removed from the rods 81 and 82 and rolled into an expanded doughnut roll. When this expanded roll is placed in water, sufficient water is absorbed so that the roll can be further stretched and worked, thus enabling water to permeate through all the layers of the roll and wet all of the hardening agent.

Prior to this invention it was not possible to satisfactorily roll a knitted cloth tube containing plaster of Paris or other hardening material, nor was it possible to stretch an already rolled up doughnut roll containing such material. This is because the knitted tubular cloth was not pretreated and therefore could not be stretched, especially to the extent necessary to realign the fibers and provide a firm roll. Now, with the pretreating step, the knit tube containing various hardening materials can be rolled and rerolled easily into a stretched doughnut roll.

Another problem overcome by this invention is that of the failure of the doughnut roll to absorb water when the old plaster of Paris-glue combination was used. If the roll was made before the glue dried, all the layers became congealed and water could not enter. However, I have discovered that when gypsum is glued to the fabric and then calcined, there is a brittling porosity of the mass which makes it take up water like a blotter. Rigidity of the dried glue before calcining prevented rolling into an expanded doughnut roll. It is even possible to apply the plaster and glue to the tube, and then roll it into a small doughnut roll while wet, and then calcine the gypsum in the roll.

The stretched doughnut roll of this invention can also be used as a carrier for molding clay or other similar type of form-making material. This material can be sprayed on the tubular cloth and the cloth then rolled and packaged, either wet or dry. As an example, a length of knitted tubular cloth 80 can be cut and placed on two rods 81 and 82, the cloth pretreated, and then stretched to the desired diameter. A composition comprising 1000 grams of molding clay and 4000 cc. of water is thoroughly mixed and heated to 120° F. and, with continuous agitation, sprayed on the cloth. As soon as the cloth is sprayed, it can be rolled into a doughnut roll, expanded or otherwise, and packaged.

As an alternative, the clay can be partially dried to a slightly crumbly state, the cloth tube then rolled into a doughnut roll, and then completely dried. When the molding-clay-containing cloth is packaged dry, it can be re-wet before use. Also, when the clay-containing cloth is moist, it can be stretched just as any of the other pretreated knitted cloth tubes.

If desired, the clay suspension can be modified by the addition of fine sand, and the wetting solution can comprise a solution of colloidal silicic acid, such as the commercial preparation called Nalcog 35% (National Aluminate Corp., Chicago). A combination of this type is preferably packaged in a moist state. Once this composition is applied to the cloth, the silicic acid dries and provides some rigidity to the cast or form. If an extremely hard, stiff form is desired, the clay can be fired.

This combination of molding clay-pretreated tubular cloth is quite useful in molding for prostheses and for use as general laminated molds. The clay-containing tube also can be cut either axially or spirally into flat strips if desired.

The tubular cloth can be sprayed with hot paraffin or other soft hydrocarbons and rolled into a doughnut roll. This roll will soften when it is placed in hot water, and thus is capable of being unrolled and used as a bandage, a binder, or other similar therapeutic device. When a stretched doughnut roll is impregnated, it is merely soaked in the hot liquid paraffin until it is completely saturated. However, cloth tubes that have not been pretreated and stretched according to this invention, can be saturated with hot liquid paraffin, stretched before the paraffin solidifies, and then rolled into a doughnut roll very satisfactorily.

Bandages for Draining Wounds

Bandages for covering draining wounds, which will prevent contamination of the wound from external sources and yet which will not materially restrict the discharge of fluid from the wound, are another feature of this invention. Many efforts have been made to find a dressing that has a smooth skin-contacting surface, that provides the required protection to the wound, and that will permit free passage of liquid from the wound. Coarsely woven cloth permits the discharge of liquid, but the threads form rough ridges that cause the tissue which they touch to grow unevenly, thus slowing down the skin's healing processes. If the cloth is woven tightly, the surface is relatively smooth but the interstices between the fibers are so small that wound drainage is considerably restricted if not totally prevented.

On the other hand, loosely knitted cloth is ideal for such a bandage, since a smooth surface can be provided next to the wound by applying the knitted cloth rightside-out or inside-out depending upon which way the ultimate stretch will run (as explained supra), and the interstices between the strands of the cloth are long potential openings, thus allowing free drainage.

Quite often bandages or dressings that are applied to draining wounds become adhered to the wounds when the draining liquid coagulates, and subsequent removal of the bandage presents a problem. One way in which the conventional bandage is removed is by simply pulling it from the wound; this is very damaging to the wound, especially to the new tissue growth, and it usually removes the protective scab that may have formed. Another way to remove a bandage over such a wound is by soaking it with a material to soften the hardened drainage; however, moistening the wound can introduce bacteria and/or other undesirables, and can also prolong healing processes.

I have found that non-adherent qualities can be imparted to bandages for this type of wound by coating the strands of the cloth with sizings or water-proofing agents which impede or prevent adhesion of the bandage to the wound. Materials such as silicones, polyethylene, Quillon (a chromium-stearic acid complex from E. I. du Pont de Nemours Co.), and various common hydrocarbons including petroleum jelly, paraffin and mineral spirits are among those suitable for this purpose. If the coating material is applied to both sides of the dressing, it may prevent adequate discharge of the fluid from the wound, and therefore I prefer to apply it only to the smooth side of the dressing, i.e., the side which will be placed next to the wound. This imparts a non-adherent property to the wound-contacting surface of the dressing, and yet does not restrict the flow of liquid from the wound.

One example of the preparation of a suitable dressing of this type is as follows. Cotton knit tubing 80 (FIG. 12) is heated and moisture pretreated according to the invention, and then stretched over two rods 81 and 82 in such a manner that its smooth side is on the outside. The strands of the cloth tube 80 are then fixed by drying and cooling while in the stretched condition. The sizing or water-proofing agent is sprayed lightly on this outer, smooth, side, and the treated tube is removed from the rods turned outside in and rolled up into a firm, stretched doughnut roll 35.

Silicone water-repellent compositions function very well as "release agents" for purposes of this invention, but cloth which has been treated with such a composition must be subjected to approximately 300° F. for two hours to water-proof its surface. This treatment prevents the cloth from stiffening and the strands from sticking together.

Quillon is a satisfactory release agent, but Quillon is water soluble and must be applied, dried, and the cloth rewashed all in the stretched condition to remove foreign materials. However, Quillon does not tend to stick the strands of the cloth together or stiffen the cloth.

A light paraffin spray, such as a mixture of about 10% paraffin and 90% mineral spirits, is another good release agent. The mineral spirits should be driven off by heat and the paraffin-coated cloth cooled while it is in its stretched condition. It has been found that this treatment has a slight tendency to stiffen the fibers and stick the threads together. This may be overcome by a temporary light stretch or tensioning in the direction required to break the adhesions between the strands, followed by a subsequent restretching in the direction required to put the strands in their parallel condition.

Another satisfactory release agent is a composition comprising 25 parts polyvinyl acetate and one part of water containing 10% Quillon. This material tends to stiffen the cloth strands and to slightly adhere them to each other. However, this release agent functions better than polyvinyl acetate alone.

When the tubular cloth is knitted out of synthetic fibers which have a smooth, non-adherent surface, it has been found that adhesion of the cloth to the wound does not occur even in the absence of any special treatment. Non-sticking dressings made of synthetic fibers must have a portion of the tube treated on two smooth rods stretched while under the application of heat at about 212° F. to 300° F. During this treatment the transverse strands should be forced together and the fabric then cooled to set them in this position.

The cloth tubes used to make the stretched doughnut rolls according to this invention can be colored in any shade and manner to provide a wide variety of effects. For example, if a two or more layered dressing, bandage or covering is used, each layer can be dyed or otherwise colored a different hue or shade so that the resulting color of the complete dressing, etc., will be a blend of the several colors. In this way a substantially unlimited range of colors can be obtained. Patterns, figures, and other indicia of substantially any kind can be produced by printing or otherwise marking the fabric, and any and all combinations of these can be made. Thus it is possible to provide brightly colored bandages, casts, etc. for children, or adults, with the stretched doughnut roll of my invention. Skin-tight, forming-fitting garments of substantially any color or with any design can also be constructed by application of suitably colored or marked fabric tubes from my stretched doughnut rolls. Colored molds and forms also can be made with appropriately colored tubular casts rolled into a stretched doughnut roll according to this invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

1. A firm, tight, doughnut-like roll of tubular fabric, said tubular fabric being extendible and contractible both radially and axially such that when it is extended in one direction it simultaneously contracts in the transverse direction, said roll being stretched radially substantially to its greatest diameter.

2. The roll of claim 1 wherein the fabric is knitted cloth.

3. The roll of claim 1 wherein the fabric is woven cloth on the bias.

4. The roll of claim 1 wherein the fabric is net on the bias.

5. A pretreated, firm, tightly wound doughnut-like roll of tubular cloth knitted from at least one strand of fibers, said strand forming intersecting loops, said tubular cloth being extendible and contractible both radially and axially such that when it is extended in one direction it simultaneously contracts in the transverse direction, said roll being stretched radially substantially to its maximum diameter.

6. The roll of claim 5 wherein the strand is made from natural fibers.

7. The roll of claim 5 wherein the strand is made from cotton.

8. The roll of claim 5 wherein the strand is made from synthetic fibers.

9. The roll of claim 5 wherein the strand is made from elastic material.

10. The roll of claim 5 wherein the cloth is knitted from two coextending strands.

11. The roll of claim 10 wherein both strands are made from synthetic fibers.

12. The roll of claim 10 wherein both strands are made from natural fibers.

13. The roll of claim 10 wherein both strands are made from elastic material.

14. The roll of claim 13 wherein one strand is more elastic than the other.

15. The roll of claim 10 wherein only one of the coextending strands is elastic.

16. The roll of claim 15 wherein there is a different degree of tension on the elastic strand than on the other strand.

17. The roll of claim 10 wherein one strand is made from cotton and the other strand is made from synthetic fibers.

18. The roll of claim 17 wherein the loops of the synthetic strand are fixed while the tubular cloth is in an axially stretched condition.

19. The roll of claim 18 wherein the loops of the cotton strand are fixed while the tubular cloth is in a radially stretched condition.

20. The roll of claim 17 wherein the loops of the synthetic strand are fixed while the tubular cloth is in a radially stretched condition.

21. The roll of claim 20 wherein the loops of the cotton strand are fixed while the tubular cloth is in an axially stretched condition.

22. An article for use in making surgical bandages, dressings, casts, and the like, comprising a cloth tube formed into a firm, tightly wound toroidal roll stretched radially substantially to its maximum diameter, said cloth tube being extendible and contractible both axially and radially such that when it is extended in one direction it simultaneously contracts in the transverse direction, said roll being impregnated with a settable material.

23. The tube of claim 22 wherein the cloth is knitted.

24. The tube of claim 23 wherein the settable material is a sizing.

25. The tube of claim 23 wherein the settable material forms a coating on the outside of said tube.

26. The tube of claim 23 wherein the settable material is a synthetic resin which hardens upon the addition of a catalyst.

27. The tube of claim 23 wherein the settable material is plaster of Paris.

28. A bandage for use on draining wounds, comprising a firm, tightly wound doughnut-like roll of cloth tube having intersecting fiber strands defining interstices, said roll being stretched radially substantially to its maximum diameter, said tube being extendible and contractible both radially and axially such that when it is extended in one direction it simultaneously contracts in the transverse direction, said tube having a smooth inside surface and an outside surface, so that when the cloth tube is applied from the roll over a draining wound the smooth inside surface will lie next to the skin and the wound will drain freely through the said interstices.

29. The bandage of claim 28 wherein the cloth is knitted.

30. The bandage of claim 28 containing means for preventing adhesion of the bandage to the wound.

31. The bandage of claim 30 wherein said means is coated on the said smooth inside surface.

32. The bandage of claim 31 wherein the said outside surface is coated with a wettable material.

33. The bandage of claim 31 wherein the said means is a silicone.

34. The bandage of claim 31 wherein said means is a polyethylene.

35. The bandage of claim 31 wherein said means comprises a chromium-stearic acid complex.

36. The bandage of claim 31 wherein said means is petroleum jelly.

37. The bandage of claim 31 wherein said means is paraffin.

34. The bandage of claim 31 wherein said means is a molds, and the like, comprising a cloth tube rolled up into a firm, tight toroidal roll, and a rigid supporting ring enclosed within said toroidal roll to increase the rigidity of the roll and facilitate smooth and even application of the tube with greater tension than possible without said ring, said tube being extendible and contractible both axially and radially such that when it is extended in one direction it simultaneously contracts in the transverse direction, said roll being stretched radially substantially to its greatest diameter.

39. The article of claim 28 wherein the ring is in the center of the toroidal roll.

40. The article of claim 39 wherein the ring is formed from and is integral with a portion of one end of the cloth tube.

41. The article of claim 38 wherein the ring is enclosed by only the outer layer of said toroidal roll.

42. A device for forming bandages, casts, molds, and the like, comprising a cloth tube which is extendible and contractible both axially and radially such that when it is extended in one direction it simultaneously contracts in the transverse direction, said tube rolled into a pair of tight, firm toroidal rolls, one roll at each end of said tube, said rolls being stretched radially substantially to their greatest diameters.

43. The device of claim 42 wherein the cloth tube is made from knitted material.

44. The device of claim 43 wherein both toroidal rolls are on the outside of the cloth tube.

45. The device of claim 44 wherein one toroidal roll is on the outside of the cloth tube and the other toroidal roll is on the inside of the cloth tube.

46. A device for forming bandages, casts, molds, and the like, comprising a cloth tube which is extendible and contractible both axially and radially such that when it is extended in one direction it simultaneously contracts in the transverse direction, said cloth tube doubled on itself to form a double-layered tube having a folded end and a cut end, said double-layered tube rolled up into a tight, firm toroidal roll stretched radially substantially to its greatest diameter.

47. The device of claim 46 wherein the cloth tube is made from knitted material.

48. The device of claim 46 wherein the toroidal roll was begun with the folded end of said double-layered tube.

49. The device of claim 46 wherein the toroidal roll was begun with the cut end of said double-layered tube.

50. A device for forming bandages, casts, molds, and the like, comprising a double-layered tube formed from a pair of separate concentric cloth tubes each of which is extendible and contractible both axially and radially such that when it is extended in one direction it simultaneously contracts in the transverse direction, said double-layered tube being rolled up into a tight, firm, toroidal roll stretched radially substantially to its greatest diameter.

51. The device of claim 50 wherein the cloth tubes are made from knitted material.

52. The device of claim 50 wherein the cloth tubes are rotated axially on their common axis in opposite directions before they are rolled into the toroidal roll.

53. A device for forming bandages, casts, molds, and the like, comprising a multiple-layered tube formed from a multiplicity of separate concentric cloth tubes each of which is extendible and contractible both axially and radially, such that when it is extended in one direction it simultaneously contracts in the transverse direction, each of said tubes having a mesh size different from each of the other tubes, said multiple-layered tube being rolled up into a firm, tight toroidal roll stretched radially substantially to its greatest diameter.

54. The device of claim 53 wherein the concentric tubes are made from knitted material.

55. The device of claim 53 wherein the concentric tubes are made from different materials, with the material of each tube different from all the others.

56. A package comprising an air-tight, moisture-impermeable container enclosing a firm, tight, doughnut-like roll of tubular fabric, said fabric being extensible and contractible radially as well as axially such that when it is extended in one direction it simultaneously contracts in the transverse direction, said roll being stretched radially substantially to its greatest diameter.

57. The package of claim 56 wherein the fabric is knitted cloth.

58. The package of claim 56 wherein the fabric is woven cloth on the bias.

59. The package of claim 56 wherein the fabric is net on the bias.

60. The package of claim 56 wherein the container is metal.

61. The package of claim 56 wherein the container is plastic.

62. The package of claim 56 wherein the container is glass.

63. A process for forming a length of strand-containing cloth tube into a radially stretched, firm, tightly wound, doughnut roll, including the steps of rolling the cloth tube up on itself into a doughnut roll, treating the strands to temporarily decrease their resistance to a sliding-type movement on one another, stretching the cloth radially to enlarge the diameter of the tube, and maintaining the cloth in the stretched condition until the strands have regained their said resistance to sliding movement.

64. The process of claim 63 wherein the cloth tube is treated and stretched before it is rolled up on itself.

65. The process of claim 64 wherein at least part of the strands are synthetic and the treating step comprises heating the cloth to an elevated temperature.

66. The process of claim 64 wherein the treating step comprises wetting the cloth.

67. The process of claim 64 wherein the treating step comprises a combination of heating the cloth to an elevated temperature and wetting the cloth.

68. The process of claim 64 wherein the treating step comprises applying to the cloth a non-aqueous material which lubricates the fibers.

69. The process of claim 63 wherein the cloth tube is treated and stretched after it is rolled upon itself.

70. The process of claim 69 wherein at least part of the strands are synthetic and the treating step comprises heating the cloth to an elevated temperature.

71. The process of claim 69 wherein the treating step comprises wetting the cloth.

72. The process of claim 69 wherein the treating step comprises a combination of heating the cloth to an elevated temperature and wetting the cloth.

73. The process of claim 69 wherein the treating step comprises applying to the cloth a non-aqueous material which lubricates the fibers.

74. The process of claim 63 wherein the cloth tube is stretched but part way to its maximum diameter, then rolled upon itself into a doughnut roll, and the doughnut roll then stretched substantially to its maximum diameter.

75. The process of claim 63 wherein the cloth tube is first stretched axially, then wound axially around a hollow ventilated core, then heated, then removed from the core and rolled into a doughnut-shaped roll, and the roll then treated and stretched radially.

76. The process of claim 63 wherein the stretched doughnut roll is placed around a circular device which holds the said roll in its stretched condition.

77. A method of preparing an expanded, firm, tightly wound roll of knitted cloth tube having strands running both axially and circumferentially, including the steps of placing the cloth tube over a pair of rod-like holders, pretreating the cloth tube to temporarily render its strands more pliable and slidable with respect to each other, separating the rods to stretch the cloth tube radially and thus enlarge its diameter, adjusting the cloth tube on the holders until the strands running circumferentially are substantially parallel and closely adjacent each other, maintaining the cloth tube in this stretched and adjusted position until they have returned to their less pliable and slidable condition, removing the stretched cloth tube from the holders, and rolling the cloth tube on itself into a doughnut-like roll.

78. The method of claim 77 wherein the treating step is performed before the colth tube is placed upon the rod-like holders.

79. The method of claim 77 wherein the treating step is performed after the colth tube is placed upon the rod-like holders.

80. The method of claim 77 wherein the stretching step is performed before the cloth tube is rolled into the doughnut-like roll.

81. The method of claim 77 wherein the stretching step is performed after the cloth tube is rolled into the doughnut-like roll.

82. A method of applying around an object a strand-containing cloth tube from a radially stretched doughnut-shaped roll thereof, comprising placing the object through the hole of the doughnut-shaped roll, attaching the free end of the cloth tube to the object, unrolling the doughnut-shaped roll around the object while simultaneously tensioning the cloth tube in an axial direction and rotating the roll so that the cloth tube smoothly and uniformly follows the contour of the object, and fastening the other end of the cloth tube so that it will remain in position.

83. The method of claim 82 wherein a rigid ring is inserted under the outer layer of the doughnut-shaped roll before it is unrolled around the object, and wherein the doughnut-shaped roll is unrolled around the object by grasping this rigid ring and pulling it with uniform rotation and axial tension along the length of the object.

84. A method of treating and protecting draining wounds without restricting the discharge of liquid matter therefrom, comprising covering the wound with a strand-containing, cloth tube which is extendible and contractible both axially and radially, such that when it is extended in one direction it simultaneously contracts in the transverse direction, from a doughnut-like roll thereof which has been stretched radially substantially to its greatest diameter, the tube first having been pretreated to increase the slidability of its strands relative to each other.

References Cited in the file of this patent

FOREIGN PATENTS

| | | |
|---|---|---|
| 602,653 | Germany | Sept. 13, 1934 |
| 756,044 | Great Britain | Aug. 29, 1956 |

UNITED STATES PATENT OFFICE
CERTIFICATE OF CORRECTION

Patent No. 3,097,644                                           July 16, 1963

Leon O. Parker

It is hereby certified that error appears in the above numbered patent requiring correction and that the said Letters Patent should read as corrected below.

Column 2, line 1, for "production" read -- product --; column 7, line 7, after "width." insert -- When stretched widthwise it has 34 threads to the inch along its length and 7 threads to the inch along its width. --; column 10, line 26, for "multiplayer" read -- multilayer --; column 11, line 54, for "glas" read -- glass --; column 17, line 27, strike out "34. The bandage of claim 31 wherein said means is a" and insert instead -- 38. A prefabricated article for forming bandages, casts, --; column 19, line 38, and column 20, line 1, for "colth", each occurrence, read -- cloth --.

Signed and sealed this 12th day of May 1964.

(SEAL)
Attest:

ERNEST W. SWIDER
Attesting Officer

EDWARD J. BRENNER
Commissioner of Patents